(12) United States Patent
Boehme et al.

(10) Patent No.: US 11,283,246 B2
(45) Date of Patent: Mar. 22, 2022

(54) MOUNTING PLATE ARRANGEMENT AND A CORRESPONDING METHOD

(71) Applicant: RITTAL GMBH & CO. KG, Herborn (DE)

(72) Inventors: Siegfried Boehme, Wolfen (DE); Heiko Holighaus, Eschenburg (DE); Daniel Brück, Sinn (DE)

(73) Assignee: RITTAL GMBH & CO. KG, Herborn (DE)

( * ) Notice: Subject to any disclaimer, the term of this patent is extended or adjusted under 35 U.S.C. 154(b) by 332 days.

(21) Appl. No.: 16/606,079

(22) PCT Filed: Feb. 13, 2018

(86) PCT No.: PCT/DE2018/100121
§ 371 (c)(1),
(2) Date: Oct. 17, 2019

(87) PCT Pub. No.: WO2018/192603
PCT Pub. Date: Oct. 25, 2018

(65) Prior Publication Data
US 2021/0143615 A1    May 13, 2021

(30) Foreign Application Priority Data

Apr. 21, 2017 (DE) .................. 10 2017 108 518.1

(51) Int. Cl.
*H02B 1/04*     (2006.01)
*H02B 1/30*     (2006.01)
*H02B 1/32*     (2006.01)

(52) U.S. Cl.
CPC ............. *H02B 1/042* (2013.01); *H02B 1/303* (2013.01); *H02B 1/32* (2013.01); *H02B 1/301* (2013.01)

(58) Field of Classification Search
CPC ... H02B 1/26; H02B 1/30; H02B 1/38; H02B 1/042; H02B 1/303; H02B 1/32; H02B 1/301
(Continued)

(56) References Cited

U.S. PATENT DOCUMENTS 5,380,083 A * 1/1995 Jones .................. A47B 47/03
                                          312/265.3
6,657,861 B2   12/2003 Irmer
(Continued)

FOREIGN PATENT DOCUMENTS

CN        1949610 A     4/2007
CN      106256058 A    12/2016
(Continued)

OTHER PUBLICATIONS

International Search Report (in English and German) and Written Opinion (in German) issued in PCT/DE2018/100121, dated Apr. 5, 2018; ISA/EP.

*Primary Examiner* — Patrick D Hawn
(74) *Attorney, Agent, or Firm* — Harness, Dickey & Pierce, P.L.C.

(57) ABSTRACT

The invention relates to a mounting plate arrangement with a switch cabinet frame and a mounting plate fastened thereto via at least one mounting plate holder, wherein the switch cabinet frame has a rectangular floor frame with four profile struts, which has on its outer side a fastening section offset relative to an outer sealing plane of the switch cabinet frame relative to the interior of the switch cabinet frame, wherein the mounting plate holder is formed in multiple parts, with a support bracket and with a base connected to the support bracket, wherein the support bracket is connected to the fastening section and to the mounting plate and the mounting plate stands on the base, and wherein the mounting plate (Continued)

holder with the base is placed on a profile side of one of the four profile struts extending between the sealing plane and the fastening section.

17 Claims, 15 Drawing Sheets

(58) Field of Classification Search
USPC .......................................................... 211/26
See application file for complete search history.

(56) References Cited

U.S. PATENT DOCUMENTS

| | | | |
|---|---|---|---|
| 8,746,465 B2 | 6/2014 | Roth | |
| 9,420,727 B2 * | 8/2016 | Lewis, II | H05K 7/183 |
| 9,871,353 B2 | 1/2018 | Boehme et al. | |
| 10,277,014 B2 | 4/2019 | Brueck et al. | |
| 10,396,531 B2 | 8/2019 | Reuter et al. | |
| 10,483,724 B2 * | 11/2019 | Reuter | H05K 7/183 |
| 10,512,190 B2 * | 12/2019 | Anderson | H05K 7/18 |
| 10,601,205 B2 * | 3/2020 | Reuter | A47B 96/1408 |
| 10,811,854 B2 * | 10/2020 | Boehme | H02B 1/013 |
| 10,925,390 B2 * | 2/2021 | Reuter | H02B 1/303 |
| 2003/0151337 A1 * | 8/2003 | Leccia | H02B 1/38 312/326 |
| 2016/0352080 A1 | 12/2016 | Brueck et al. | |
| 2016/0352082 A1 | 12/2016 | Eoehme et al. | |
| 2018/0375302 A1 | 12/2018 | Reuter et al. | |
| 2019/0130680 A1 | 5/2019 | Holighaus | |
| 2019/0214798 A1 | 7/2019 | Schindler et al. | |
| 2019/0252866 A1 | 8/2019 | Reuter et al. | |
| 2019/0372316 A1 * | 12/2019 | Boehme | H02B 1/013 |

FOREIGN PATENT DOCUMENTS

| | | | |
|---|---|---|---|
| CN | 205901128 U | 1/2017 | |
| DE | 4312487 A1 | 10/1994 | |
| DE | 19737488 C1 | 5/1999 | |
| DE | 102014101404 A1 | 8/2015 | |
| DE | 102017108518 B4 | 1/2019 | |
| EP | 0167833 A2 | 1/1986 | |
| EP | 2171816 B1 | 6/2014 | |
| EP | 3566270 A1 | 11/2019 | |
| FR | 2681478 A1 * | 3/1993 | H02B 1/305 |
| WO | 2018/192603 A1 | 10/2018 | |

* cited by examiner

MOUNTING PLATE ARRANGEMENT AND A CORRESPONDING METHOD

CROSS-REFERENCE TO RELATED APPLICATIONS

This application is a 371 U.S. National Phase of International Application No. PCT/DE2018/100121, filed on Feb. 13, 2018, which claims the benefit of German Application No. 10 2017 108 518.1, filed on Apr. 21, 2017. The entire disclosures of the above applications are incorporated herein by reference.

BACKGROUND

This section provides background information related to the present disclosure which is not necessarily prior art.

Technical Field

The invention relates to a mounting plate arrangement with a switch cabinet frame and a mounting plate fastened thereto via at least one mounting plate holder, wherein the switch cabinet frame has a rectangular floor frame with four profile struts, which has on its outer side a fastening section offset relative to an outer sealing plane of the switch cabinet frame relative to the interior of the switch cabinet frame. Such a mounting plate arrangement is known from DE 10 2014 101 404 A1.

Discussion

In order to achieve the best possible utilization of space inside the switch cabinet, it is generally desirable to arrange the mounting plate inside the switch cabinet frame as rearwardly as possible, i.e. as close as possible to the rear of the switch cabinet. In particular, if the mounting plate has already been populated before it is mounted in the switch cabinet and can therefore weigh a considerable amount, it is expedient for the mounting plate to be fastened as easily as possible to the switch cabinet frame.

SUMMARY

This section provides a general summary of the disclosure, and is not a comprehensive disclosure of its full scope or all of its features.

It is therefore an aspect of the invention to further develop a mounting plate arrangement of the type described above in such a way that it immediately permits space-saving and convenient mounting of a mounting plate inside the switch cabinet frame.

Accordingly, the mounting plate assembly provides that the mounting plate holder is formed in multiple parts, with a support bracket and with a base connected to the support bracket, wherein the support bracket is connected to the fastening section and to the mounting plate and the mounting plate stands on the base, and wherein the mounting plate holder with the base is placed on a profile side of one of the four profile struts of the rectangular floor frame extending between the sealing plane and the fastening section.

In particular, the described mounting plate arrangement allows the mounting plate to be placed "from the outside" on the floor assembly at the rear of the switch cabinet frame so that the mounting plate can then be connected solely to the frame, for example by screwing it to the frame at an upper edge of the mounting plate. In particular, it is no longer necessary to guide the mounting plate via the door side of the switch cabinet frame through the interior of the switch cabinet to the rearmost position of the frame. Instead, the mounting plate with the pre-assembled at least one mounting plate holder can be placed from the outside on the profile side of the profile strut of the rectangular floor frame and, if necessary, swiveled into the vertical position.

It may be provided that the support bracket has, at its end facing the interior of the switch cabinet frame, a retaining web which engages behind the fastening section of the profile strut of the rectangular floor frame when the mounting plate is in the vertical position. The retaining web may also be designed to release the fastening section if the mounting plate is placed on the profile strut but is tilted at a certain angle to the vertical, for example 30°. In particular, if components are already arranged on the mounting side of the mounting plate facing the interior of the switch cabinet, the mounting plate has a torque in the vertical which pushes the mounting plate in the direction of the fastening section or in the direction of the switch cabinet door side, respectively.

The support bracket can be connected to the base via a plug connection. It may also be provided that the base has a passage through which the support bracket extends with a fixing tab between opposite sides of the base, the mounting plate being fixed to the fixing tab.

The support bracket may have an L-shaped section with which it embraces the fastening section. In particular, a retaining web may be formed at the free end of the L-shaped section which engages behind the fastening section and thus fixes the mounting plate in the direction perpendicular to the sealing plane, at least when the mounting plate is arranged vertically. The retaining web may be disengaged from the fastening section when the mounting plate is angled to the vertical, for example 30°-45°.

The base can rest with a support side on an L-shaped section of the support bracket with which it embraces the fastening section, wherein the mounting plate stands on the support side with a front face of an edging on its outer circumference. The mounting plate may each have an edging, in particular at its opposite edges, preferably at its two opposite parallel vertical edges. The edging can, for example, be a C-edging or a U-edging. At its horizontal lower edge, the mounting plate can have a horizontal edging bent at 90° from the mounting plane, which is recessed in the area of the edging at the vertical edges of the mounting plate, so that a receptacle is formed in which the support side of the base is accommodated.

The base may have a spacer and a support side, the support bracket extending through the support side with a fixing tab, and the mounting plate being fixed to the fixing tab.

The support side may have a first opening and a L-shaped section of the support bracket, with which the support bracket embraces the fastening section, may have a second opening. The fastening section may have a third opening, the three openings being aligned and a fastener, in particular a threaded bolt, passing through the aligned openings.

The mounting plate may have an edging on a vertical outer circumference, in particular a C-edging or an U-edging, with a first mounting profile side arranged in a mounting plane of the mounting plate and a reinforcing profile side spaced therefrom perpendicularly to the mounting plane. The reinforcing profile side can extend parallel to the mounting profile side.

In a first mounting position, the mounting plate can rest against and be fixed to a fixing tab of the support bracket via the mounting profile side.

In a second mounting position, the mounting plate can rest against and be fixed to a fixing tab of the support bracket via the reinforcing profile side.

In the first mounting position, the mounting profile side can be aligned with an inner fastening profile side of the fastening section facing the interior of the switch cabinet frame and/or, in the second mounting position, the mounting profile side can be aligned with an outer fastening profile side of the fastening section facing the sealing plane.

The support bracket may comprise a first material and the base may comprise a second material different from the first material, the modulus of elasticity of the first material being larger than the modulus of elasticity of the second material. The base, and in particular the support side of the base, can therefore have the function of a damping element. It has been found that, when selecting the base and support bracket materials in the manner described above, the mounting plate holder can withstand higher loads than one-piece mounting plate holders, especially under mechanical stress due to vibration, especially compared to mounting plate holders made exclusively of steel.

For example, the first material may be a metal, in particular a steel, and the second material may be a plastic, in particular a thermoplastic and preferably a polyamide.

The support bracket may be a Z-profile or be in the form of a Z-profile, having an L-shaped section with which the support bracket embraces the fastening section, and having a fixing tab which merges into the L-shaped section via a 90° bend and has a fourth opening which is aligned with another opening in an edging on the outer circumference of the mounting plate. The edging may be an U-edging or a C-edging and/or may be arranged on a vertical outer edge of the mounting plate.

The base can have a spacer with which the base stands on the profile side of the profile strut, and a support side with which the mounting plate holder projects over a horizontal fixing profile side of the fastening section. A passage may be arranged through the base, through which the support bracket extends with a fixing tab, in a transition between the spacer and the support side. The support bracket can rest against the spacer with its fixing tab adjacent to the 90° bend.

The method for mounting a mounting plate arrangement may comprise the steps:
- providing a switch cabinet frame with a rectangular floor frame with four profile struts, wherein the floor frame has on its outer side a fastening section offset relative to an outer sealing plane of the switch cabinet frame to the interior of the switch cabinet frame;
- providing a mounting plate and a mounting plate holder which is formed in multiple parts and comprises a support bracket and a base releasably connected to the support bracket;
- mounting the mounting plate holder on the mounting plate by fixing a fixing tab of the support bracket to an edging on a vertical outer edge of the mounting plate so that a front face of the edging rests on the base; and
- placing the mounting plate via the base on a profile side of one of the four profile struts extending between the sealing plane and the fastening section and, if necessary, swiveling the mounting plate until a mounting plane of the mounting plate is brought into the vertical.

Providing the mounting plate holder may comprise connecting the support bracket to the base by pushing the fixing tab of the support bracket through the base via a passage of the base until an L-shaped section of the support bracket rests against a support side of the base.

Placing the mounting plate may comprise placing the mounting plate via the outer side of the floor frame and/or via the outer sealing plane of the switch cabinet frame.

After placing the mounting plate, the mounting plate can be removed via an inner fastening profile side of the fastening section facing the interior of the switch cabinet frame. For this, a fastening bolt, which connects the mounting plate with the fixing tab, can be released beforehand, if necessary. The removal of the mounting plate via the interior of the switch cabinet is particularly simple if the mounting plate is fastened to the fixing tab via its reinforcing profile side, preferably by the fixing tab being placed against the reinforcing profile side via the outer side of the reinforcing profile side facing away from the mounting plane of the mounting plate and screwed to it.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are described in the figures below.

DETAILED DESCRIPTION

Example embodiments will now be described more fully with reference to the accompanying drawings.

Figure 1:
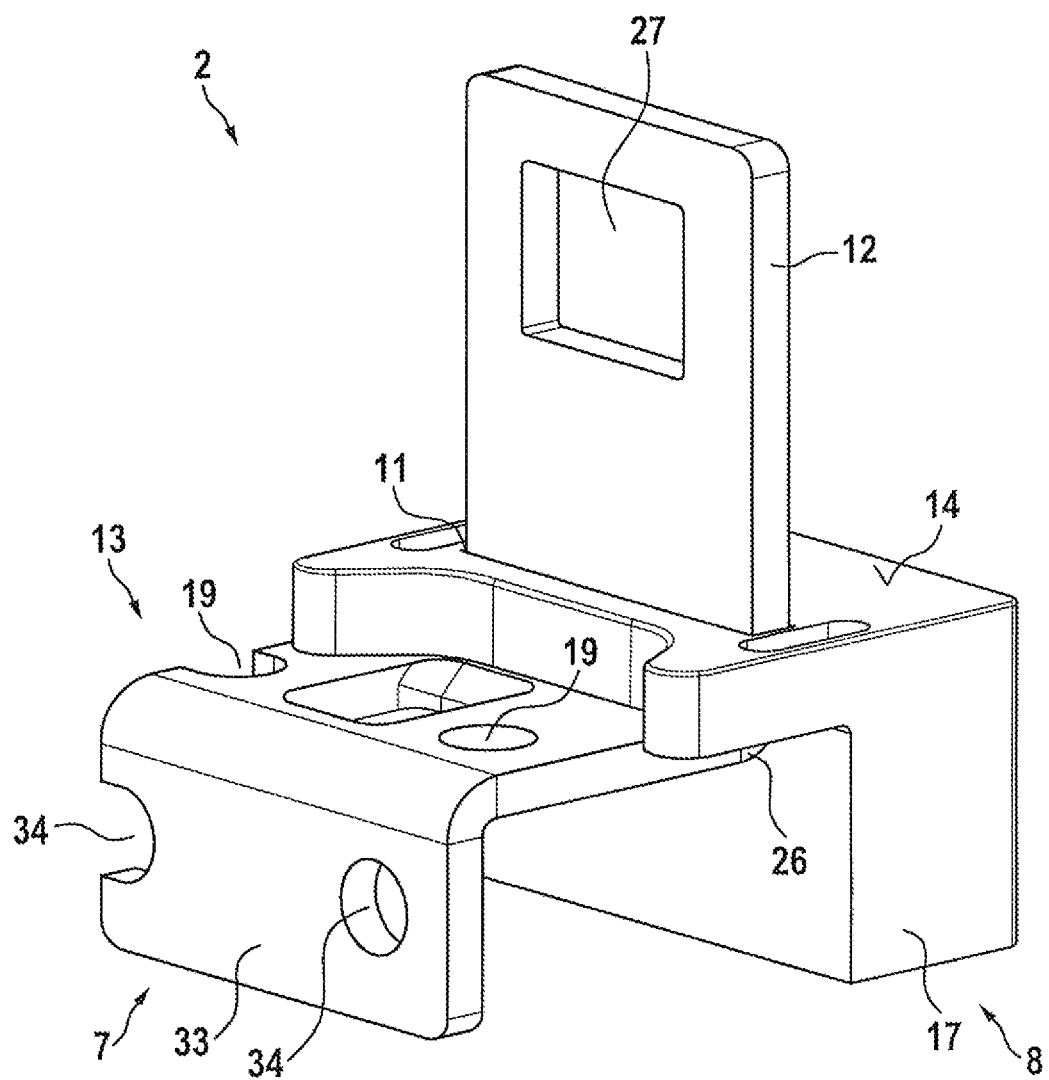
FIG. 1 shows a first embodiment of a mounting plate holder in perspective view.

FIG. 1 shows an exemplary embodiment of a mounting plate holder 2. The mounting plate holder consists of a support bracket 7 and a base 8, which are connected to each other via a plug connection. The base has a spacer 17 and a support side 14 adjacent to its upper side. Via spacer 17, the mounting plate holder can be placed on the profile side of a profile strut of a rectangular floor frame of a switch cabinet frame. The profile side can be aligned substantially horizontally for this purpose.

The support bracket 7 with its fixing tab 12 extends through a passage 11 in the support side 14 through the base 8, so that the fixing tab 12 extends essentially perpendicular to the support side 14. As will be explained with reference to the other figures, a mounting plate can stand on the support side 14 with the front side of its lateral vertical edging, while the fixing tab 12 can be fixed to the edging of the mounting plate with the aid of the opening 27. For this purpose, the opening 27 can be used, for example, to accommodate a cage nut.

Figure 2:
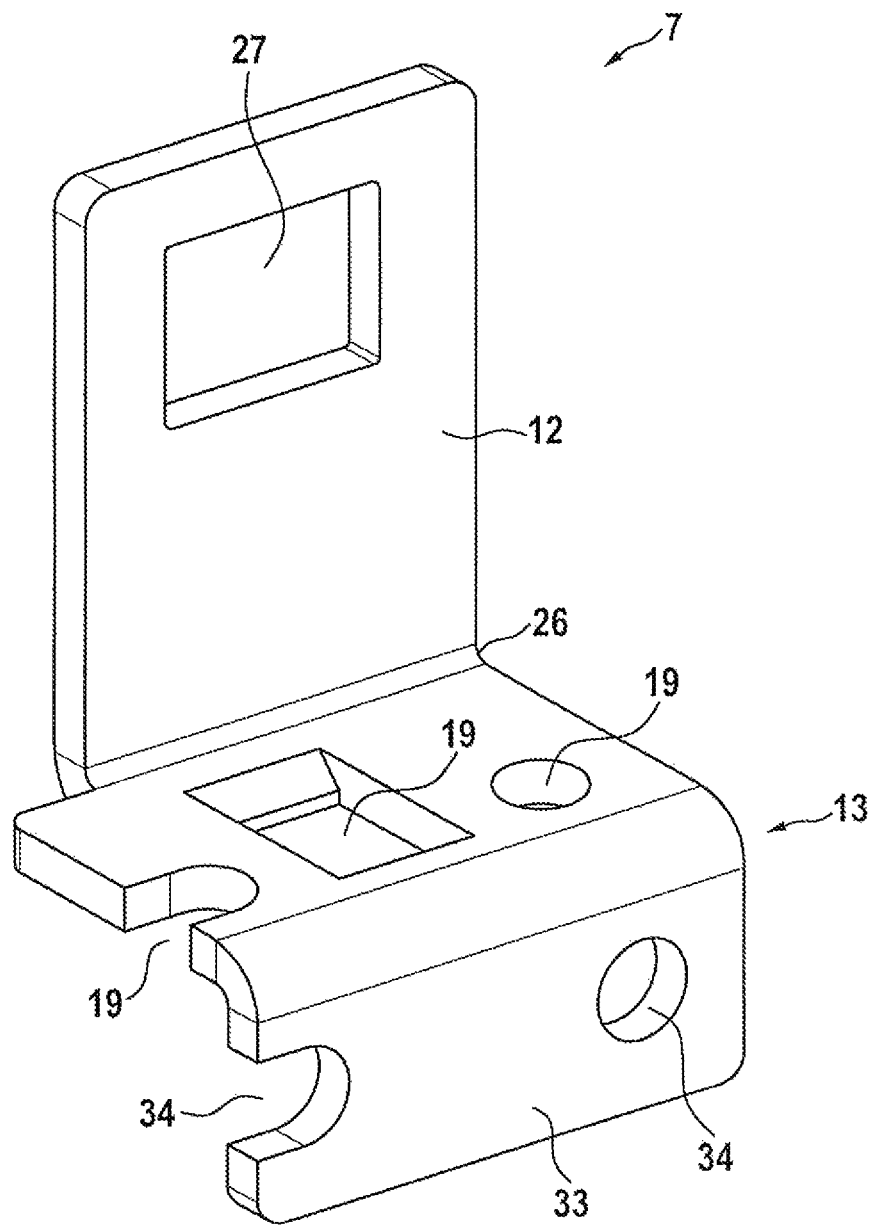
FIG. 2 shows the support bracket of the embodiment according to FIG. 1 in perspective view.

The support bracket 7 is shown in more detail in FIG. 2. It substantially consists of a Z-bend, which in turn is made up of the L-shaped section 13 and the fixing tab 12 adjoining it via a 90° bend. The fixing tab 12, in turn, comprises the opening 27 for fixing a fastener, such as a cage nut.

The L-edging 13 may have a retaining web 33 at its end remote from the fixing tab 12, which allows the support bracket 7 to engage behind the fastening section of the profile frame when the mounting plate is in the vertical so that the mounting plate is fixed in the plane perpendicular to the sealing plane. Further openings 34 in the retaining web 33 can be used to fix the support bracket 7 and thus the mounting plate holder 2 to the fastening section of a floor frame. The L-shaped section 13 also has openings 19, which can also be used to screw or otherwise secure the support bracket 7 and thus the mounting plate holder 2 to a horizontal fastening side of the fastening section 6.

The combination of FIGS. 1 and 2 shows that the support bracket 7 and the base 8 are substantially to be connected by plugging them together and, in particular, it is not necessary that the mounting plate holder 2 is formed in one piece, even though, depending on the embodiment, it may also be conceivable that, for example if the base 8 is made of plastic and the support bracket 7 is made of steel, the mounting plate holder by moulding the base 8 around the support bracket 7.

Figure 3:
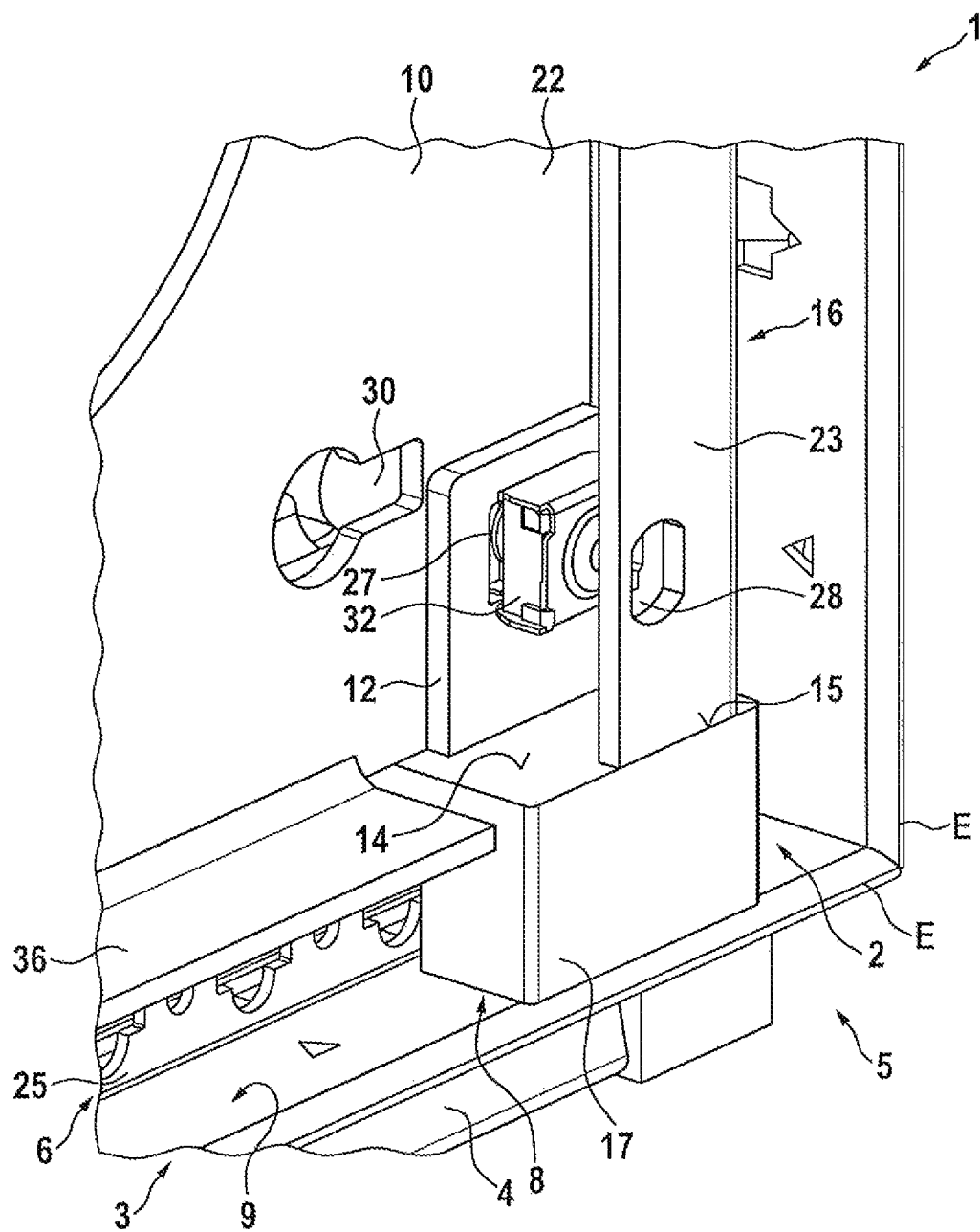
FIG. 3 shows a mounting plate arrangement in perspective view of the outer side of the switch cabinet frame using the mounting plate holder according to FIG. 1.

FIG. 3 shows the mounting plate holder 2 shown in FIGS. 1 and 2 as it is fixed to the underside of a mounting plate 10 in the transition area from the lower bend 36 to the lateral edging 16. In particular, the mounting plate 10 stands with its front side 15 of the vertical lateral edging 16 on the support side 14 of the base 8, while the horizontal bend 36, which is formed by a 90° bend of the mounting side 22 to the rear of the mounting plate 10, is accommodated in the area of the edging 16 in a recess of the horizontal edging 36. The fixing tab 12 has a cage nut 32 inserted in the opening 27, which can be connected to the opening 27 via a snap-in connection in particular. A bolt 30 extends from the front of the mounting plate 10 through the mounting side 22 of the mounting plate 10, through the fixing tab 12 and the cage nut 32 to fix the mounting plate 10 to the fixing tab 12.

The switch cabinet frame 1 has a rectangular floor frame 3 of four profile struts 4, which has on its outer side 5 a fastening section 6 offset from an outer sealing plane E of the switch cabinet frame 1 to the interior of the switch cabinet frame 1. The mounting plate holder 2 is placed with the base on a profile side 9 of the profile strut 4, which extends between the sealing plane E and the fastening section 6, in particular between the mounting plane ME and the outer fastening profile side 25 of the fastening section 6.

Figure 4:
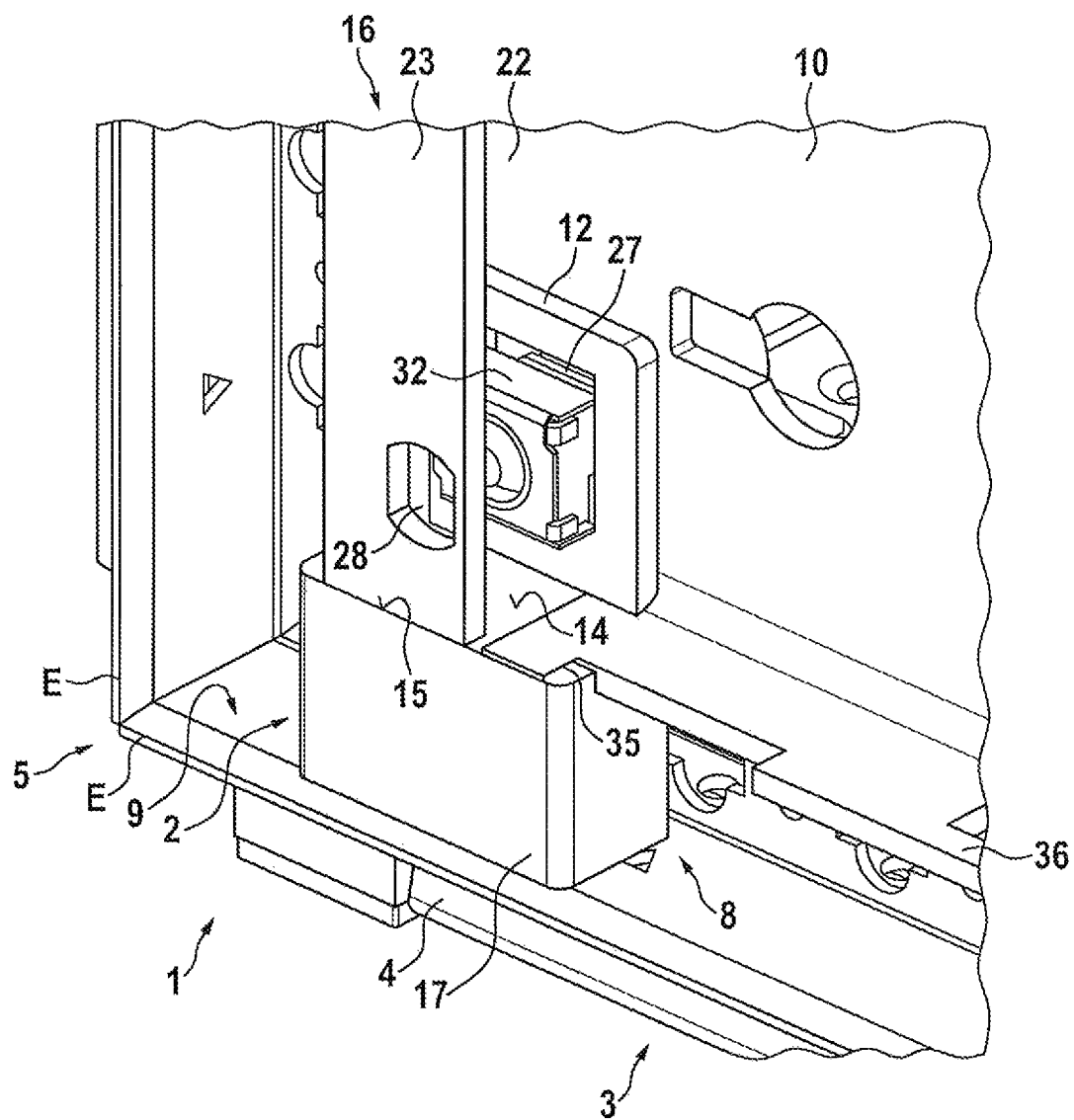
FIG. 4 shows another embodiment of a mounting plate arrangement in perspective view of the outer side of the switch cabinet frame.

Compared to the arrangement according to FIG. 3, the mounting plate arrangement provided for in FIG. 4 in particular provides that the base 8 has a positive fit 35 on its support side 14, in which the horizontal edging 36 is form-fittingly received and thus the mounting plate holder 2 is fixed in the horizontal direction.

FIGS. 3 and 4 also show that the edging 16 may have an opening 28 on its mounting profile side 22 and on its reinforcing profile side 23 in order to optionally fix the mounting profile side 22 via the reinforcing profile side 23 to the fixing tab 12 of the support bracket 7, depending on whether the mounting plate 10 is to be arranged in a "rearmost position", in which the mounting plane of the mounting plate is aligned with the outer fastening profile side 25 of the fastening section 6, or in a "rear mounting position" in which the mounting plane of the mounting plate 10 is aligned with a fastening profile side 24 of the fastening section 6 facing the interior of the frame 1.

The arrangement of the mounting plate 10 in the interior of the frame 1 according to the "rearmost mounting position" as shown in FIGS. 3 and 4 is the most space-saving way of mounting a mounting plate 10 in the interior of the frame 1. The sealing plane E is formed by a circumferential sealing edge of the frame 1, against which a flat part of the switch cabinet, e.g. a rear wall of the switch cabinet, can be placed in a sealing manner. As can be seen, the base 8 on the one hand and the reinforcing profile side 23 on the other hand are arranged directly in front of the sealing level.

Figure 5:
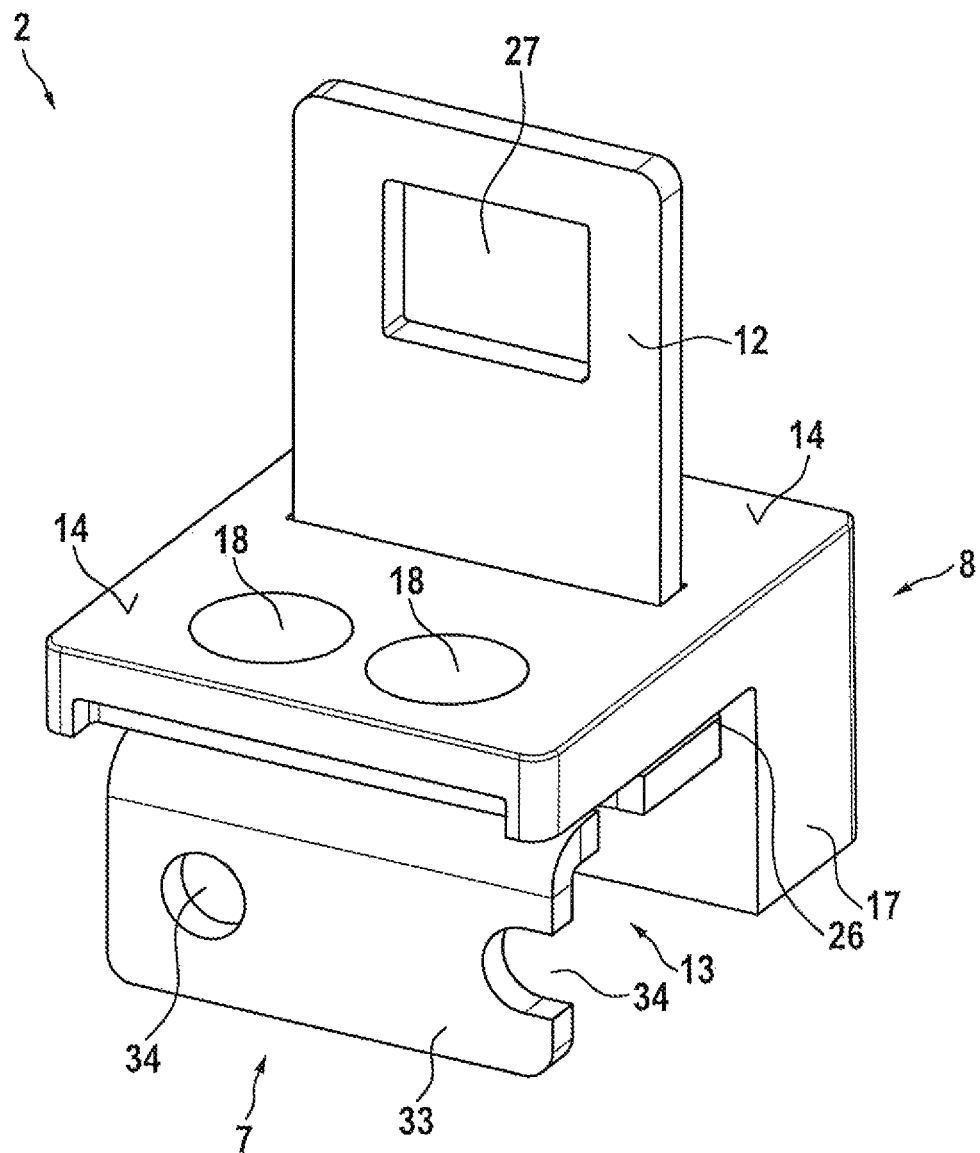
FIG. 5 shows another embodiment of a mounting plate holder in perspective view.
Figure 6:
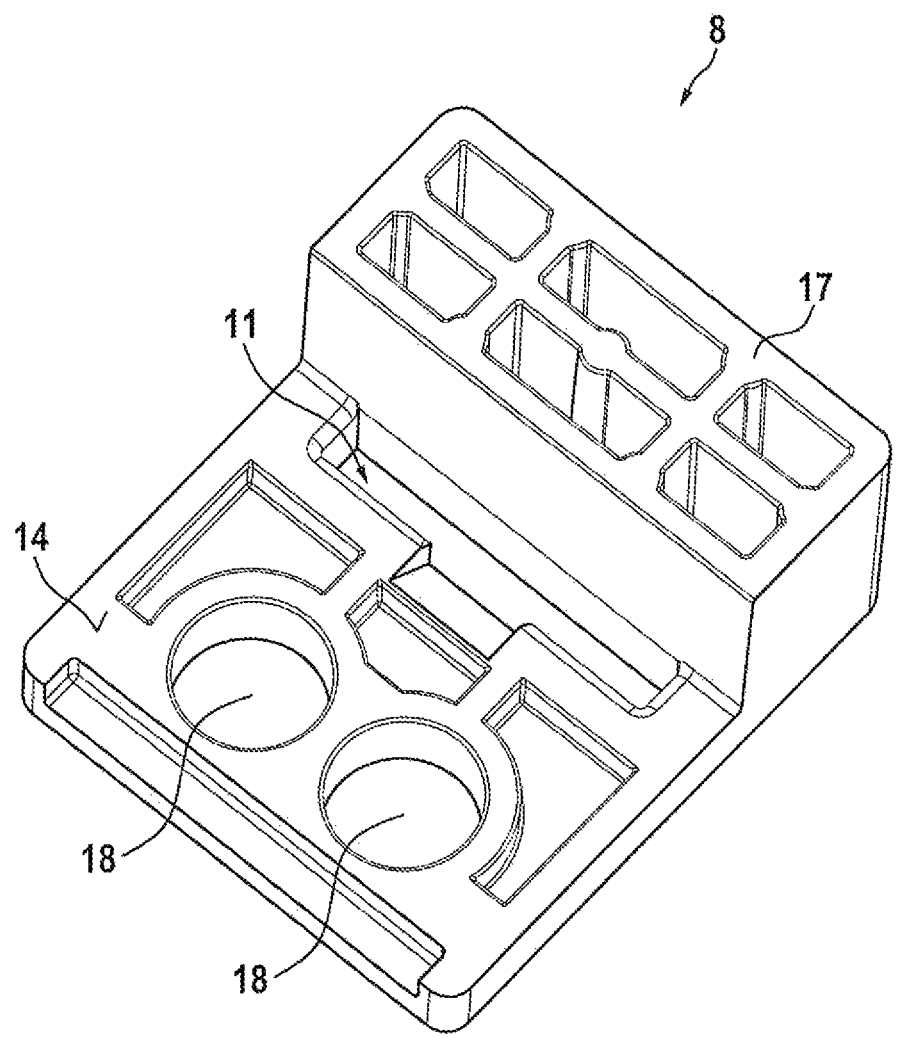
FIG. 6 shows a detailed view of the base of the mounting plate holder according to FIG. 5 in perspective view of the bottom of the base.
Figure 7:
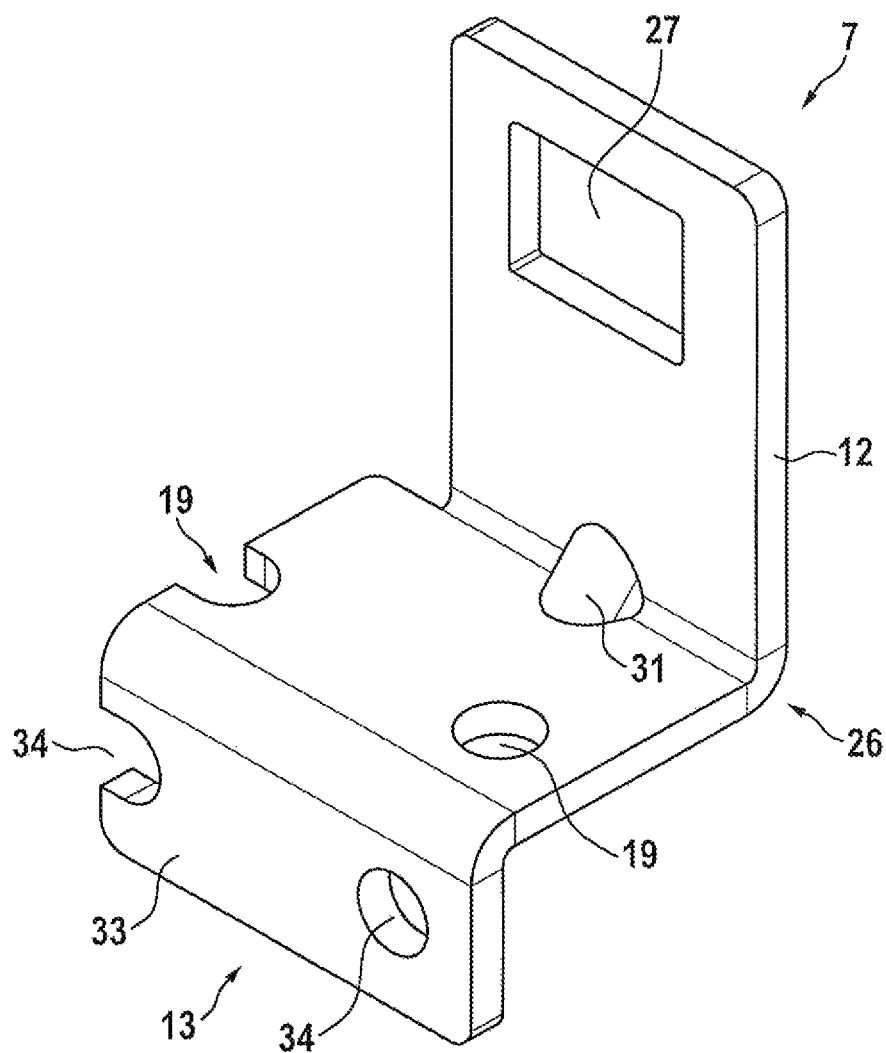
FIG. 7 shows a detailed view of the support bracket of the mounting plate holder according to FIG. 5 in perspective view.
Figure 8:
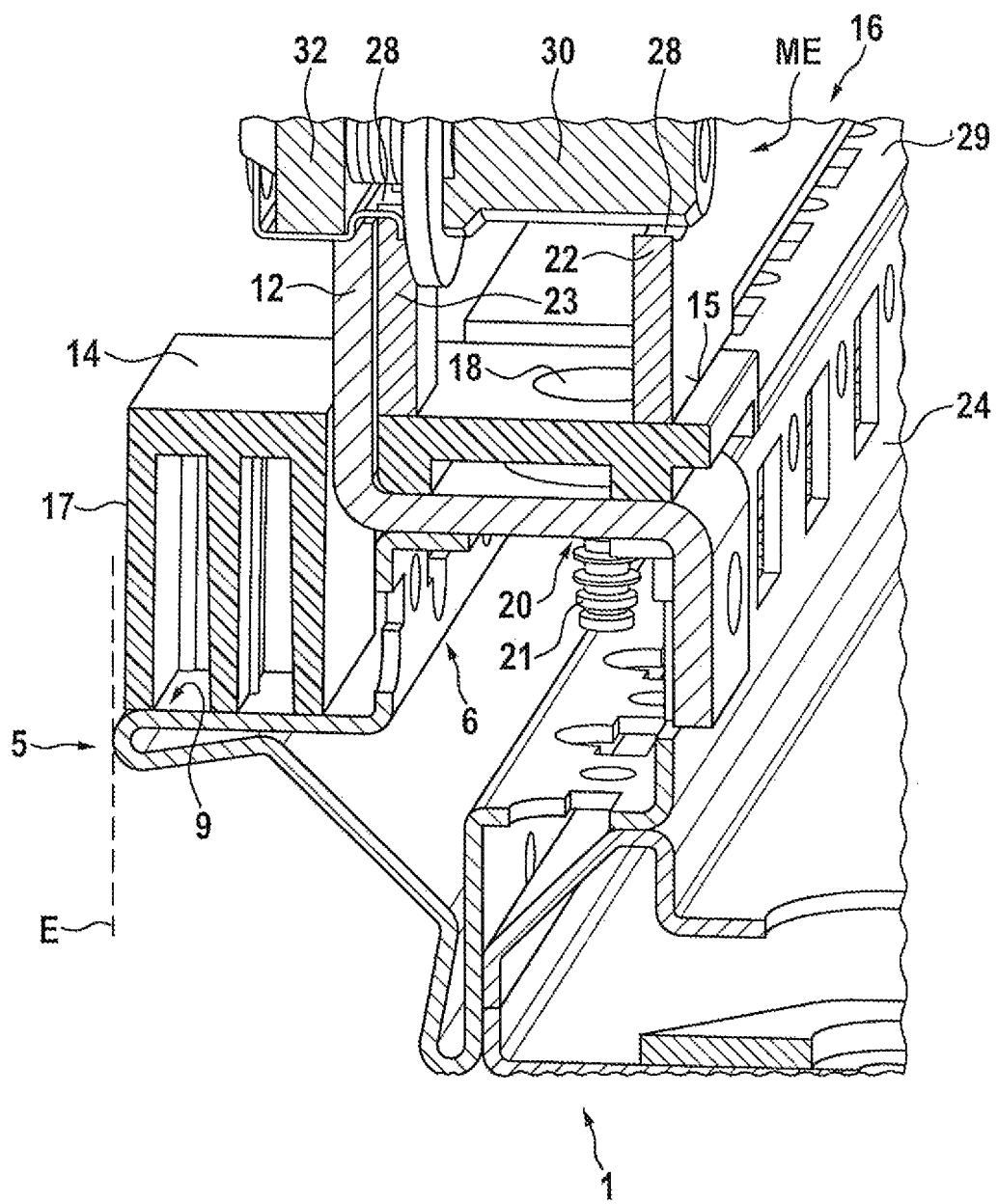
FIG. 8 shows another embodiment of a mounting plate arrangement using the mounting plate holder according to FIG. 5 in cross-sectional view.

FIGS. 5 to 7 show another embodiment of a mounting plate holder which differs from the mounting plate holder shown in FIGS. 1 and 2 in particular in that the support side 14 of the base 8 projects completely beyond a horizontal side of the L-shaped section 13, so that a flat, continuous support side 14 is created for both of the previously described mounting positions of the mounting plate with respect to the fixing tab 12. In addition, the support side 14 has first openings 18, which are aligned with second openings 19 of the support bracket 7. As shown in combination with FIG. 8, the openings 18, 19 can be aligned with a further opening 20 in a horizontal fastening profile side 29 of the fastening section 6, so that the three mentioned components can be screwed together using a bolt 21.

As can be clearly seen, in particular, in FIG. 6, the base 8 can have a passage 11 at a transition between the spacer 17, via which the base 8 can be placed on the profile side of a profile strut of the rectangular floor frame, and the support side 14, via which the support bracket 7 (see FIG. 5) can pass through with its tab 12, until the horizontal side of the L-shaped section 13 rests flat against the underside of the support side 14 and thus the base 8 and the support bracket 7 form a unit. The retaining web 33 of the L-shaped section 13 extends at a distance from and parallel to the spacer 17 on the underside of the support side 14 so that the fastening section 6 (see FIG. 8) can be accommodated in the receptacle formed by the retaining web 33, the spacer 17 and the horizontal side of the L-shaped section 13. The 90° bend 26, through which the fixing tab 12 merges into the L-shaped section 13, has a bead 31 to reinforce the support bracket 7.

Figure 9:
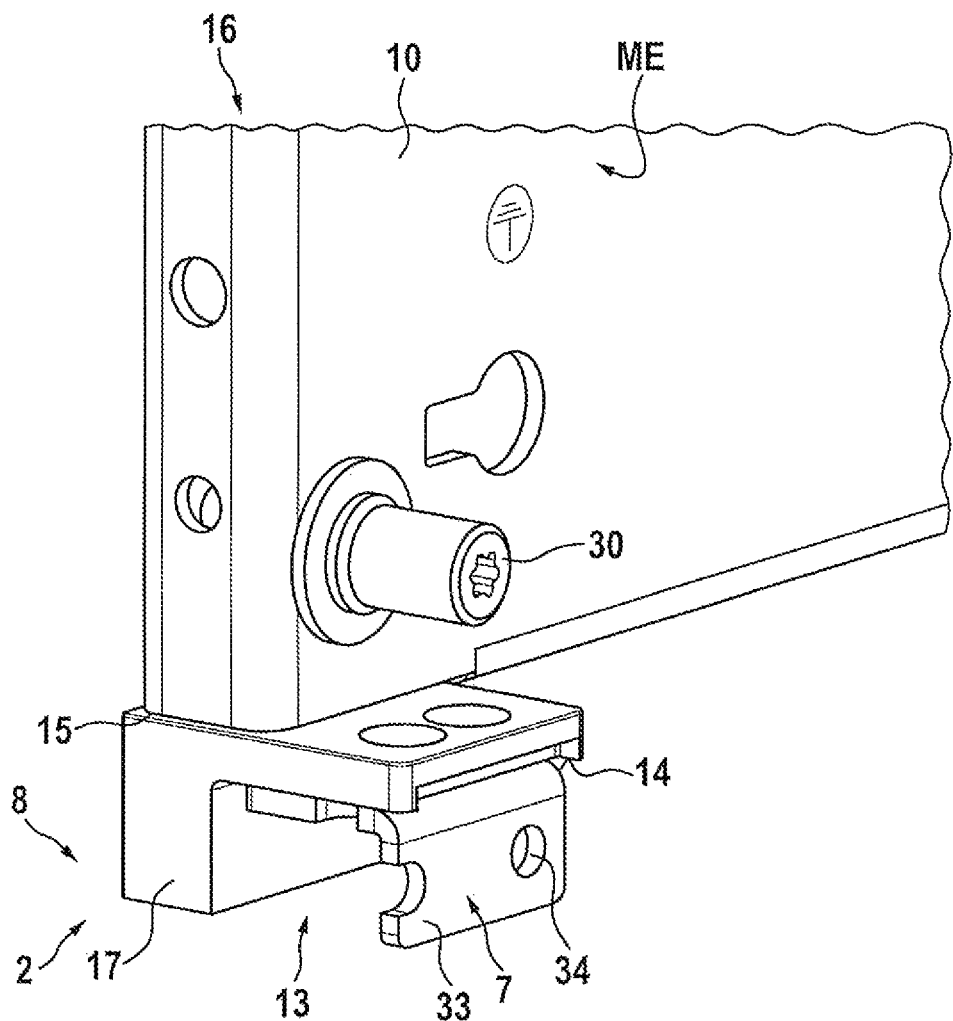
FIG. 9 shows an embodiment of a mounting plate holder, which is fixed to a mounting plate in a first mounting position.
Figure 10:
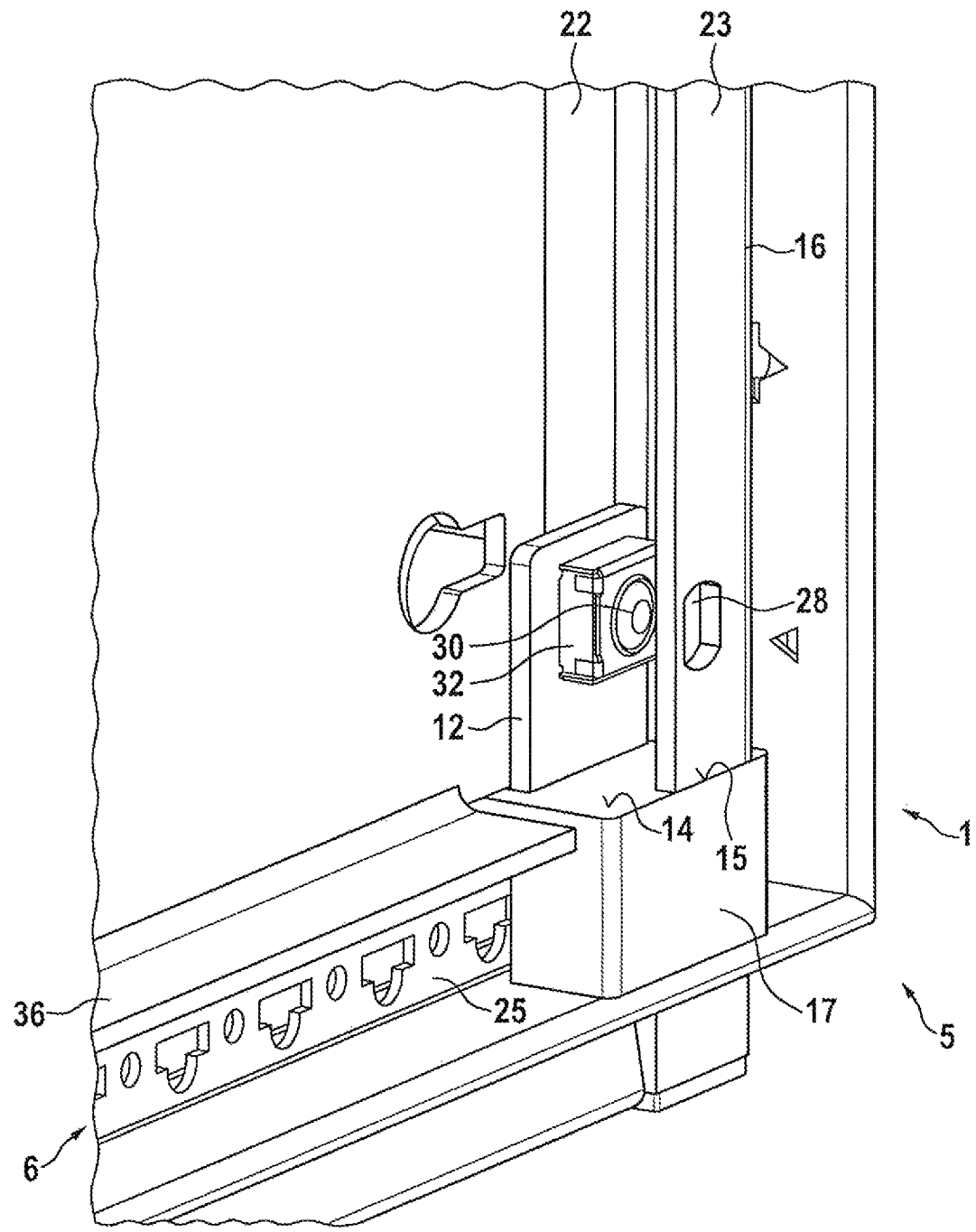
FIG. 10 shows a mounting plate arrangement using the arrangement according to FIG. 9 in perspective view of an outer side of the frame.
Figure 11:
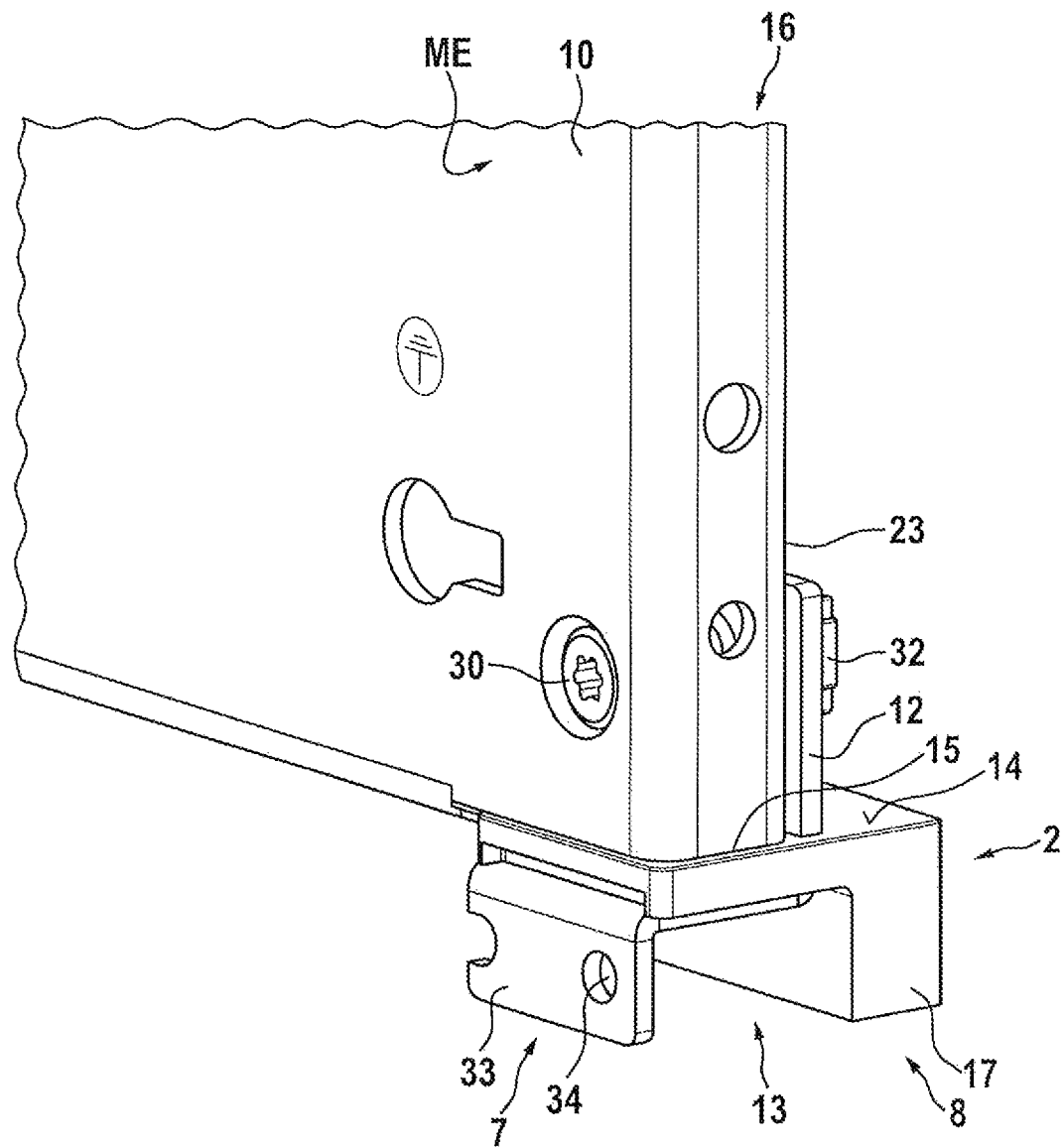
FIG. 11 shows the embodiment of a mounting plate holder according to FIG. 9, wherein the mounting plate holder is fixed to the mounting plate in a second mounting position.

Whereas in FIGS. 8 and 11 to 13 the mounting plate 10 is arranged in the "rear mounting position", in which the fixing tab 12 is screwed to the reinforcing profile side 23, the mounting plate 10 is arranged in the "rearmost mounting position" according to FIGS. 9 and 10, in which the fixing tab 12 is screwed to the mounting profile side 22. In the mounting arrangement shown in FIG. 8, the edging 16 on the support side 14 is arranged ahead of the spacer 17, whereas in the mounting position shown in FIGS. 9 and 10, the edging 16 is placed directly above the spacer 17 on the support side 14 and screwed to the fixing tab 12 via the mounting plane ME.

Figure 12:
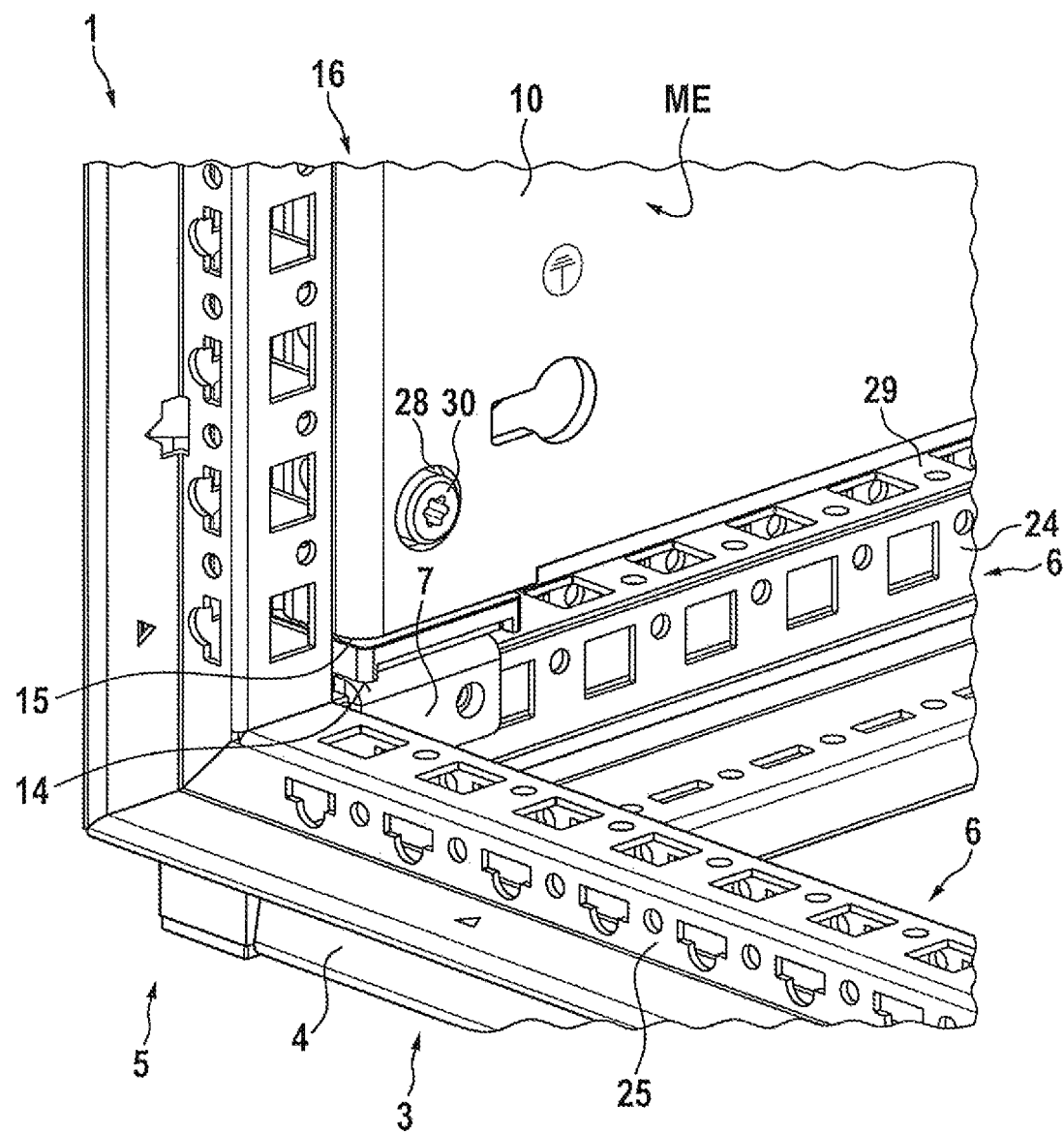
FIG. 12 shows a mounting plate arrangement using the arrangement according to FIG. 11 in perspective view of the mounting plane of the mounting plate.

FIG. 12 shows that when the mounting plate is arranged in the "rear mounting position" (see also FIG. 8), the mounting plane ME can align with an inner fastening profile side 24 of the fastening section 6, so that a continuous mounting plane is created inside the switch cabinet between the inner fastening profile side 24 and the mounting plane ME.

If the mounting plate has been attached to the switch cabinet frame from the outside of the switch cabinet frame, this does not prevent the mounting plate 10 from being removed in the usual way via the inside of the switch cabinet frame 1. All that is required is to loosen the fixing bolt 30 via the mounting plane ME and the further opening 28 provided therein so that it disengages from the cage nut 32 (see FIG. 8). Since the fixing tab 12, viewed from the inside of the switch cabinet frame, is arranged behind the edging 16, the mounting plate 10 can be removed towards the front after loosening the bolt 30.

Figure 13:
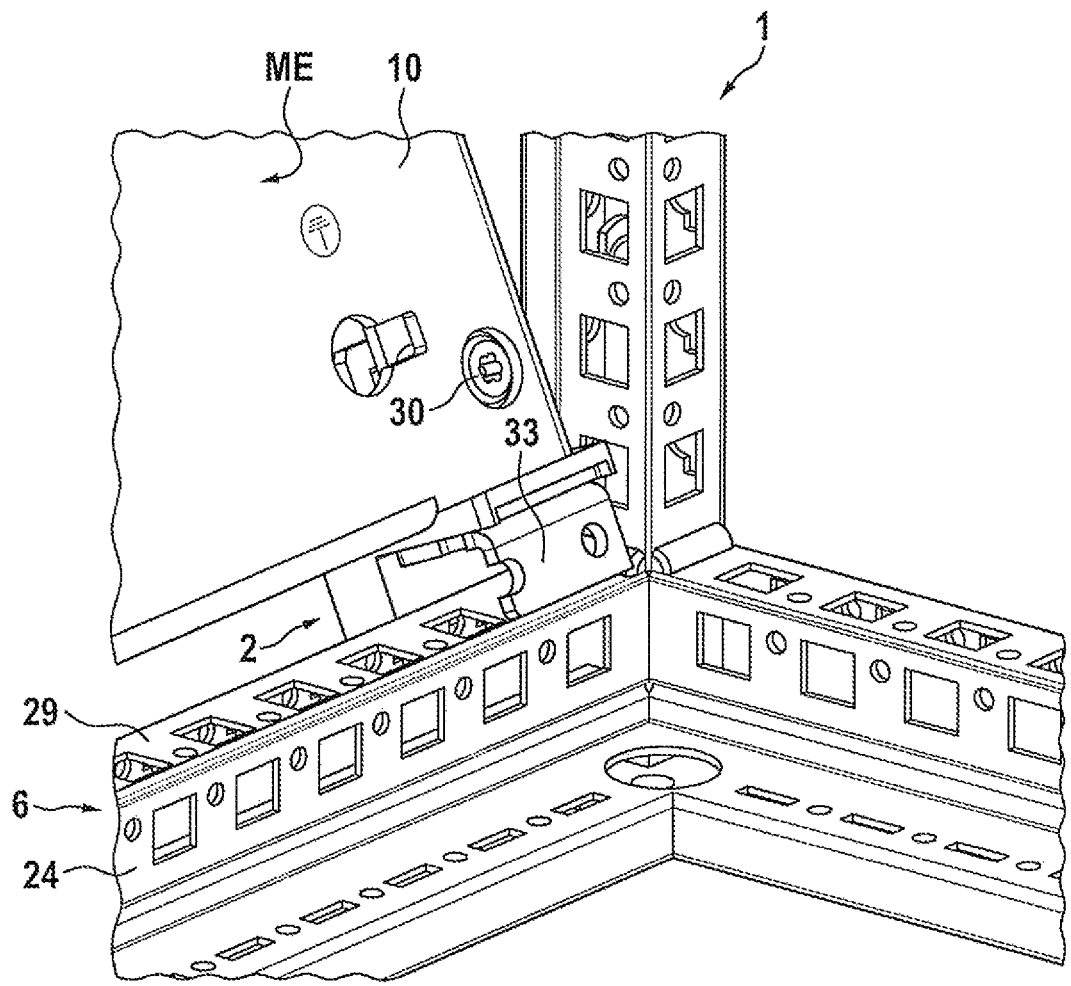
FIG. 13 shows the swiveling of the mounting plate arrangement according to FIG. 12.

As illustrated in FIG. 13, the mounting plate arrangement according to the invention allows the mounting plate 10 to be swiveled from the outside of the frame 1 to its vertical mounting position with the mounting plate holder 2 pre-assembled at its lower edge, whereby the holder 2 engages behind the fastening section 6 with its retaining web 33 and comes into contact with the inner fastening profile side 24, so that it can be screwed to the fastening profile side 24 if necessary. By loosening the bolt 30, the mounting plate 10 can be removed at any time in the usual way via the inside of the frame 1.

Figure 14:
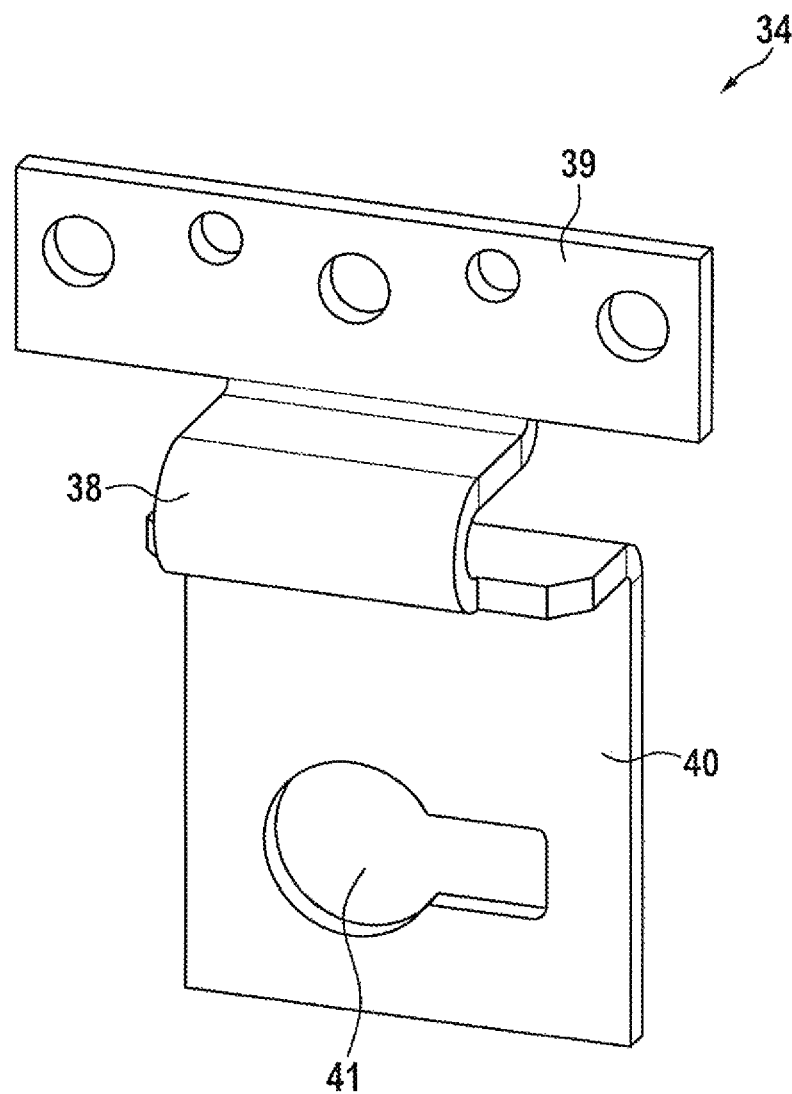
FIG. 14 shows an embodiment of a top mounting plate holder.
Figure 15:
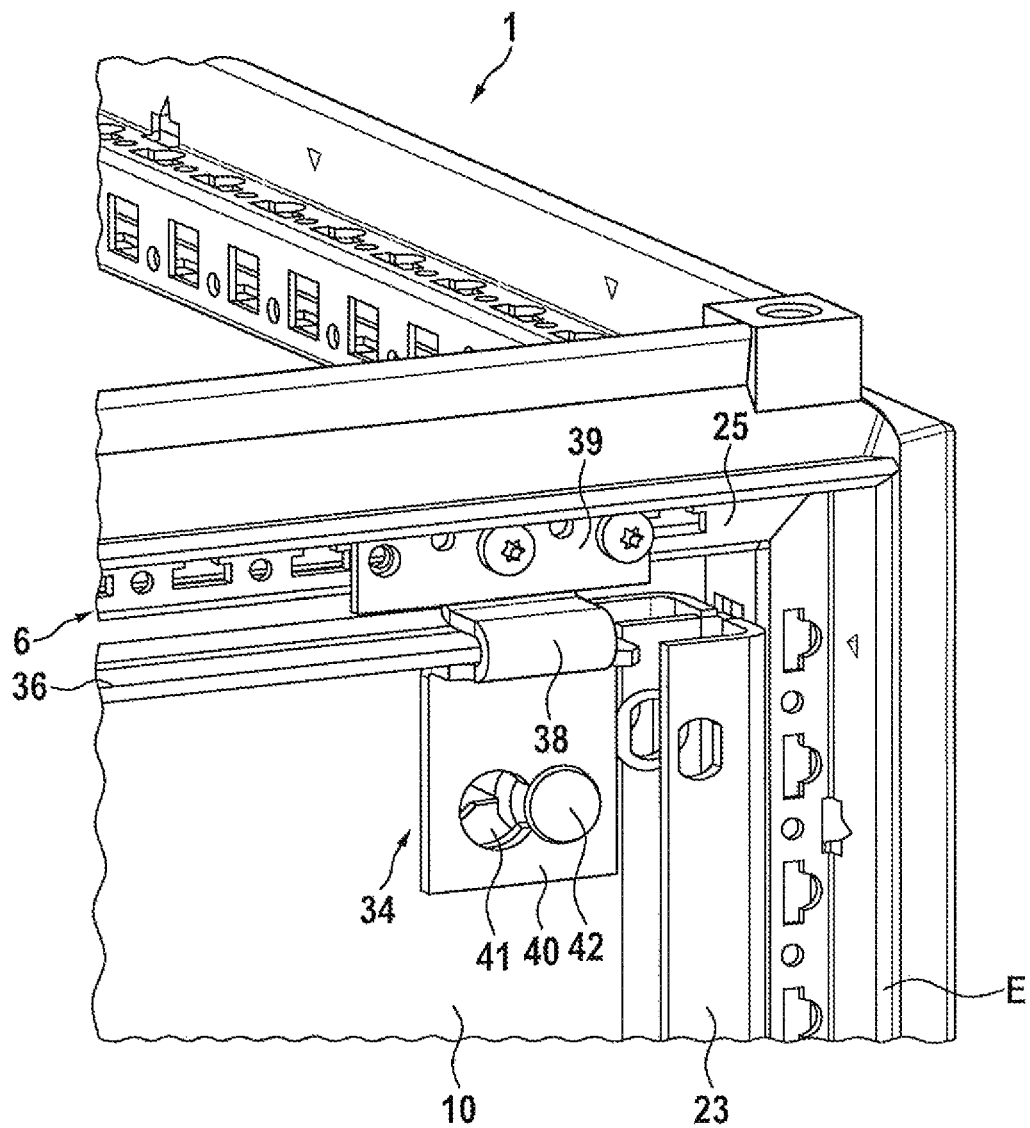
FIG. 15 shows a mounting plate holder arrangement using the top mounting plate holder according to FIG. 14.

FIGS. 14 and 15 show a possible embodiment of a top mounting plate holder 37. The top mounting plate holder has a fastening flange 39, via which it can be fixed to the outer fastening profile side 25 of a frame 1, and a bearing flange 40 via which the holder 37 can be brought into contact with the rear of the mounting plane ME of a mounting plate and screwed to the mounting plate 10 using a bolt 42. The fastening flange 39 and the bearing flange 40 are connected to each other by a bend 38, in which a horizontal edging 36 of the mounting plate 10 engages from the inside of the frame 1. This allows that even after the mounting plate 10 has been mounted via the outer side of the frame 1, the mounting plate 10 can still be removed from the switch cabinet subsequently in the usual way via the inside of the frame, for example if the back of the frame is closed with a flat part from the outside after the mounting plate 10 has been mounted.

The features of the invention disclosed in the above description, in the drawings and in the claims may be essential for the realization of the invention, either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mounting plate arrangement with a switch cabinet frame and a mounting plate fastened thereto via at least one mounting plate holder, comprising wherein the switch cabinet frame has a rectangular floor frame with four profile struts, which has on its outer side a fastening section offset relative to an outer sealing plane of the switch cabinet frame relative to the interior of the switch cabinet frame, wherein the mounting plate holder is formed in multiple parts, with a support bracket and with a base connected to the support bracket, wherein the support bracket is connected to the fastening section and to the mounting plate and the mounting plate stands on the base, and wherein the mounting plate holder with the base is placed on a profile side of one of the four profile struts extending between the sealing plane and the fastening section.

2. The mounting plate arrangement according to claim 1, in which the support bracket is connected to the base via a plug connection.

3. The mounting plate arrangement according to claim 1, in which the base has a passage through which the support bracket extends with a fixing tab between opposite sides of the base,
the mounting plate being fixed to the fixing tab.

4. The mounting plate arrangement according to claim 1, in which the support bracket has an L-shaped section, with which it embraces the fastening section.

5. The mounting plate arrangement according to claim 1, in which the base rests with a support side on an L-shaped section of the support bracket with which it embraces the fastening section, wherein the mounting plate stands on the support side with a front face of an edging on its outer circumference.

6. The mounting plate arrangement according to claim 1, in which the base has a spacer and a support side, the support bracket extending through the support side with a fixing tab, and the mounting plate being fixed to the fixing tab.

7. The mounting plate arrangement according to claim 6, in which the support side has a first opening and a L-shaped section of the support bracket, with which the support bracket embraces the fastening section, has a second opening and the fastening section has a third opening, the three openings being aligned and a fastener, in particular a threaded bolt, passing through the aligned openings.

8. The mounting plate arrangement according to claim 1, in which the mounting plate has an edging on a vertical outer circumference, in particular a C-edging or an U-edging, with a first mounting profile side arranged in a mounting plane of the mounting plate and a reinforcing profile side spaced therefrom perpendicularly to the mounting plane, wherein
 a) in a first mounting position, the mounting plate rests against and is fixed to a fixing tab of the support bracket via the mounting profile side, and/or
 b) in a second mounting position, the mounting plate can rest against and be fixed to a fixing tab of the support bracket via the reinforcing profile side.

9. The mounting plate arrangement according to claim 8, in which in the first mounting position, the mounting profile side is aligned with an inner fastening profile side of the fastening section facing the interior of the switch cabinet frame and/or, in the second mounting position, the mounting profile side is aligned with an outer fastening profile side of the fastening section facing the sealing plane.

10. The mounting plate arrangement according to claim 1, in which the support bracket comprises a first material and the base comprises a second material different from the first material, the modulus of elasticity of the first material being larger than the modulus of elasticity of the second material.

11. The mounting plate arrangement according to claim 10, in which the first material is a metal, in particular a steel, and the second material is a plastic, in particular a thermoplastic and preferably a polyamide.

12. The mounting plate arrangement according to claim 1, in which the support bracket is a Z-profile, having an L-shaped section with which the support bracket embraces the fastening section, and having a fixing tab which merges into the L-shaped section via a 90° bend and has a fourth opening which is aligned with another opening in an edging on the outer circumference of the mounting plate.

13. The mounting plate arrangement according to claim 10, in which the base has a spacer with which the base stands on the profile side of the profile strut, and a support side with which the mounting plate holder projects over a horizontal fixing profile side of the fastening section, wherein a passage is arranged through the base, through which the support bracket extends with a fixing tab, in a transition between the spacer and the support side and the support bracket rests against the spacer with its fixing tab adjacent to the 90° bend.

14. A method for mounting a mounting plate arrangement, which comprises the steps:

providing a switch cabinet frame with a rectangular floor frame with four profile struts, wherein the floor frame has on its outer side a fastening section offset relative to an outer sealing plane of the switch cabinet frame to the interior of the switch cabinet frame;

providing a mounting plate and a mounting plate holder which is formed in multiple parts and comprises a support bracket and a base releasably connected to the support bracket;

mounting the mounting plate holder on the mounting plate by fixing a fixing tab of the support bracket to an edging on a vertical outer edge of the mounting plate so that a front face of the edging rests on the base; and placing the mounting plate via the base on a profile side of one of the four profile struts extending between the sealing plane and the fastening section and, if necessary, swiveling the mounting plate until a mounting plane of the mounting plate is brought into the vertical.

15. The method according to claim 14, in which providing the mounting plate holder comprises connecting the support bracket to the base by pushing the fixing tab of the support bracket through the base via a passage of the base until an L-shaped section of the support bracket rests against a support side of the base.

16. The method according to claim 14, in which placing the mounting plate comprises placing the mounting plate via the outer side of the floor frame and/or via the outer sealing plane of the switch cabinet frame.

17. The method according to claim 14, in which after placing the mounting plate, the mounting plate is removed via an inner fastening profile side of the fastening section facing the interior of the switch cabinet frame.

* * * * *